United States Patent [19]

De Fazio

[11] 4,440,031

[45] Apr. 3, 1984

[54] FORCE DETECTING SYSTEM FOR REMOTE CENTER COMPLIANCE DEVICE

[75] Inventor: Thomas L. De Fazio, Watertown, Mass.

[73] Assignee: The Charles Stark Draper Laboratory, Cambridge, Mass.

[21] Appl. No.: 288,979

[22] Filed: Jul. 31, 1981

[51] Int. Cl.³ .............................................. G01L 5/16
[52] U.S. Cl. .................... 73/862.04; 73/862.64; 33/169 C
[58] Field of Search ........... 73/862.04, 862.06, 862.54, 73/862.64; 33/169 C, 185 R; 414/5

[56] References Cited

U.S. PATENT DOCUMENTS

| | | | |
|---|---|---|---|
| 3,921,445 | 11/1975 | Hill et al. | 73/862.04 |
| 4,059,011 | 11/1977 | Reiss | 73/826.04 X |
| 4,099,409 | 7/1978 | Edmond | 73/862.04 |
| 4,141,664 | 2/1979 | Moran et al. | 403/53 |
| 4,316,329 | 2/1982 | Watson | 33/169 C |
| 4,332,066 | 6/1982 | Hailey et al. | 33/169 C X |

*Primary Examiner*—Charles A. Ruehl
*Attorney, Agent, or Firm*—Joseph S. Iandiorio

[57] ABSTRACT

A force detecting system for a remote center compliance device, including: a first rigid monolithic part; a second rigid monolithic part spaced from the first part; at least three compressible, shear deformable means interconnecting the first and second parts and disposed along conical radii from a center; and at least one axial proximity displacement sensor for detecting the distance between the parts.

18 Claims, 8 Drawing Figures

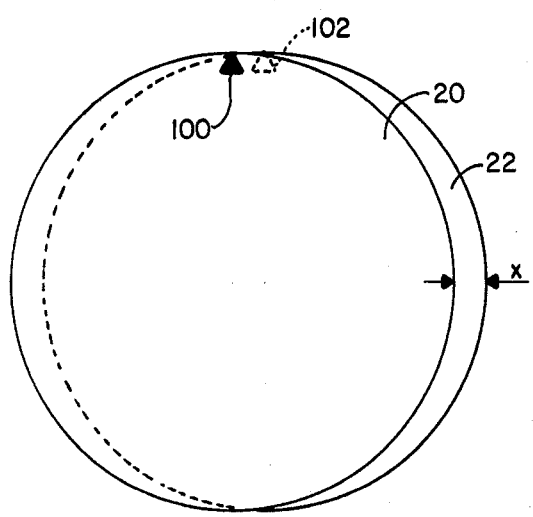
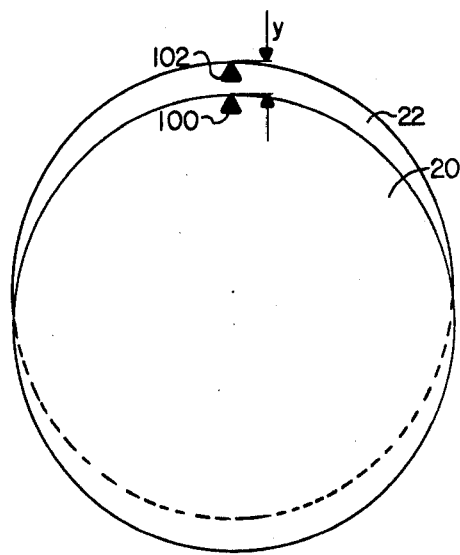
FIG. 4     FIG. 5
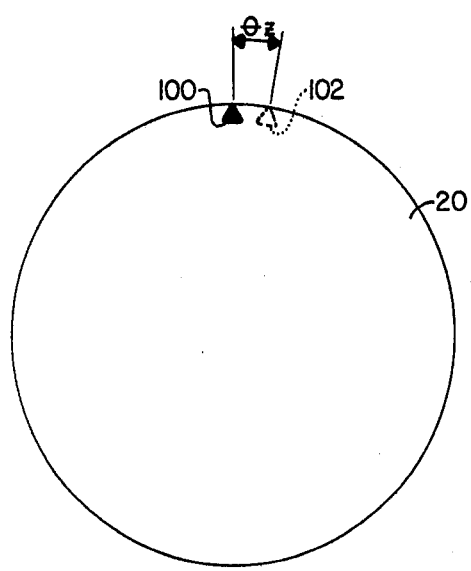
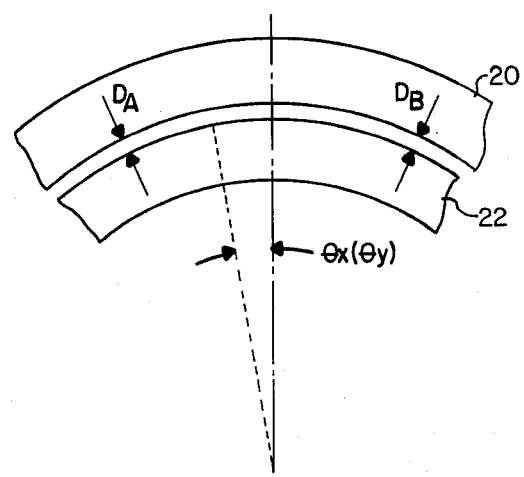
FIG. 6     FIG. 7

FORCE DETECTING SYSTEM FOR REMOTE CENTER COMPLIANCE DEVICE

FIELD OF INVENTION

This invention relates to a force detecting system for a remote center compliance (RCC) device which is axially compressible and shear deformable.

BACKGROUND OF INVENTION

Remote center compliance (RCC) devices provide a remote center of compliance at, near, or beyond the free end of an operator means or member. The operator member, with the remote center near its tip, may perform or carry parts that perform various functions, e.g. docking, tooling, insertion, engaging. The remote center of compliance is a point about which rotation of the operator member occurs and with respect to which translation of the operator member occurs. RCC devices have five major degrees of freedom, rotation about the axis of the operator member, and rotation and translation along two mutually perpendicular lateral axes orthogonal to the axis of the operator member. The RCC device is a passive device and translations and rotations are the result of forces and torques applied during operation. The translations and rotations may be in any combination, depending upon the specific compliance of the RCC device and the applied load, within the range of the physical limits of the RCC device.

Determination of the axial force applied to an RCC device is an important and useful function. Any particular RCC device has a limit beyond which the RCC device may be damaged. Additionally, the members with which the RCC device engages or cooperates are often delicate or require delicate insertion or contact forces which it would be well to monitor. Even in more rugged RCC device operations where heavy loads are applied, the monitoring of elevated axial forces is a valuable feature. Previously, force detection was available through force sensors which were of relatively delicate construction to permit sensing of small, as well as large, forces. Such sensors had to be coupled to the RCC device through means of generally heavy, large couplings. One solution for the protection of the RCC, the workpieces, or the sensor provided a spring-locked station to hold the work addressed by the RCC device. The station used a spring loaded table set to give way in order to protect the RCC device and the workpiece when the force exceeded a safe threshold.

SUMMARY OF INVENTION

It is therefore an object of this invention to provide an improved, simple force detecting system for an RCC device.

It is a further object of this invention to provide such a system for use with an axial compressible and shear deformable RCC device.

It is a further object of this invention to provide such a system which is small, compact, lightweight, and requires no additional interface mechanism to determine axial force.

It is a further object of this invention to provide such a system which may also supply indications of rotational displacement of relative parts of the RCC device.

It is a further object of this invention to provide such a system which may also supply indications of lateral displacements of relative parts of the RCC device.

This invention addresses the problem of axial-force determination, monitoring, control, or documentation during process, across an RCC device, by means of addition of instrumentation directly to the RCC device itself, and without the addition of delicate, bulky, massive, or awkward specialized force-measuring structures. The inferred axial force or the resulting force signal may be used to monitor, document, or control a process involving the RCC device.

The invention results from the realization that a force detecting system for certain classes of RCC devices can be constructed with one or more axial proximity sensors to detect the distance between two rigid monolithic parts and convert the displacement to a force.

The invention features a force detecting system for an RCC device having first and second rigid monolithic parts spaced from each other. There is a compressible, shear deformable means interconnecting the first and second parts and disposed along conically-disposed radii from a center. At least one axial proximity displacement center detects the distance between the two parts.

In a preferred embodiment the compressible, shear deformable means includes at least three compressible, shear deformable members. There are three axial proximity detectors interspaced between the members and lying along conically-disposed radii from the center. There may also be lateral component sensor means for detecting the relative lateral position of the parts and means for detecting the relative axial rotation of the parts. There are means responsive to an axial displacement, typically one or more proximity displacement sensors, for determining the axial force that caused the sensed displacement. When a number of axial proximity displacement sensors are used, the means for determining the axial force includes means for averaging the outputs of the actual proximity sensors and means for applying a scaling factor to convert the average axial displacement to an axial force. There may also be included means responsive to the difference in displacement sensed by a pair of axial displacement sensors to determine the cocking angle of the parts relative to each other.

DISCLOSURE OF PREFERRED EMBODIMENT

Other objects, features and advantages will occur from the following description of a preferred embodiment and the accompanying drawings, in which.

Figure 8:
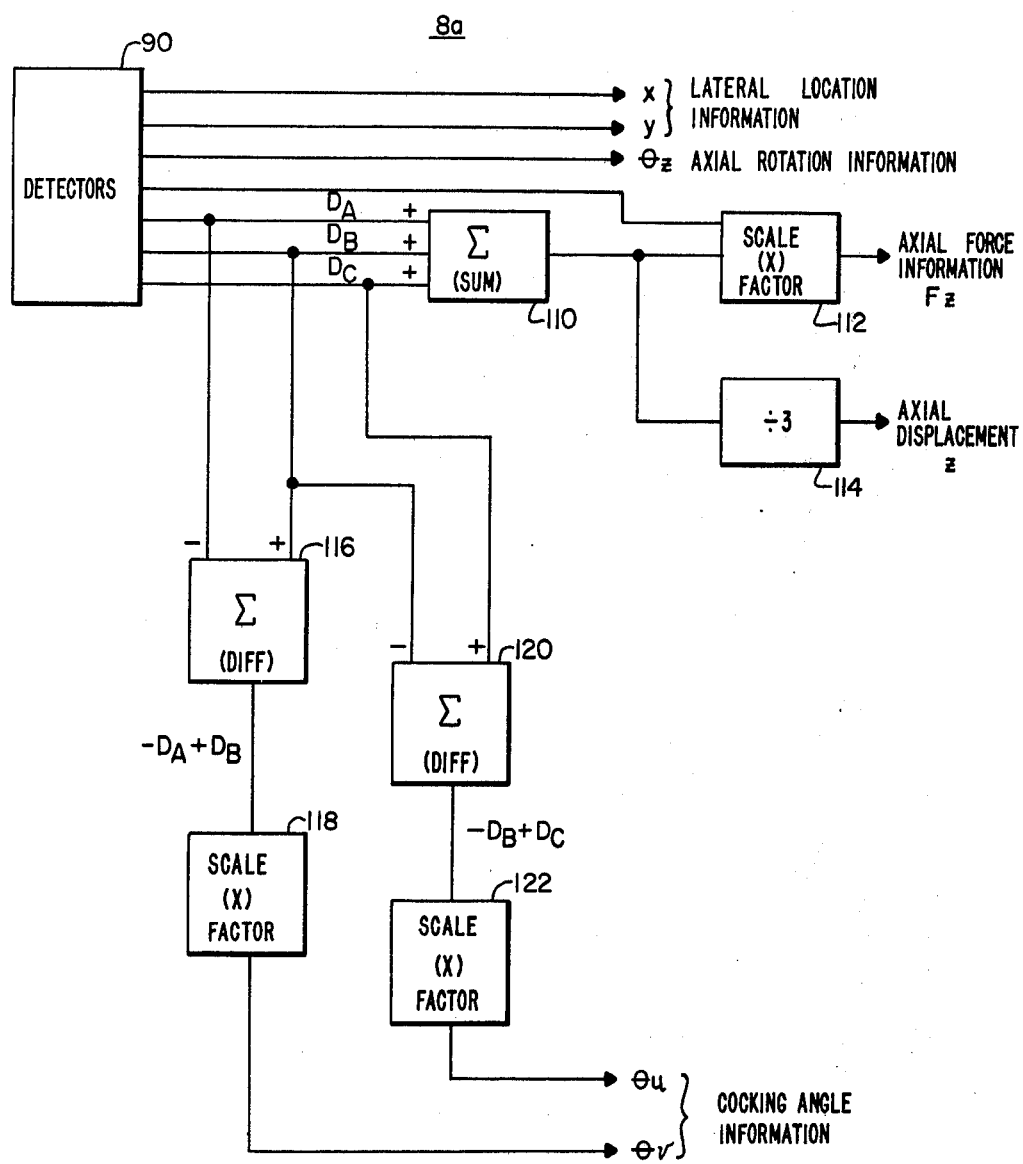

FIGS. 4, 5, 6, and 7 are schematic illustrations of some of the relative displacements of an RCC device which may be detected; and FIG. 8 is a detailed block diagram of a system according to this invention for determining not only axial force information but axial displacement information, cocking angle information, lateral location information and axial rotation information.

The invention may be accomplished with a force detecting system for an RCC device comprising first and second spaced, rigid monolithic parts. There is a compressible, shear deformable means typically including three compressible, shear deformable members interconnecting the first and second parts and disposed along conically-disposed radii from a center. The members are typically formed of alternate laminations of polymeric or elastomeric layers and rigid shim layers, but members of other descriptions can serve, including members as simple as open-coil or compression coil springs. There is at least one axial proximity displacement sensor for detecting the distance between the parts, and typically there are three. The proximity sensors may be eddy-current-type proximity sensors of the Kaman type. Ther may also be one or more detectors to determine lateral location information and axial rotation information, such as a Quantrad or UDT type biaxial detector, Reticon RL 256G solid state line scanners, or even simple paired photodiodes, mounted opposite appropriate sources of collimated light. The light source would be mounted on either rigid monolith and the receiver would be mounted opposite on the other rigid monolithic part.

Figure 1:
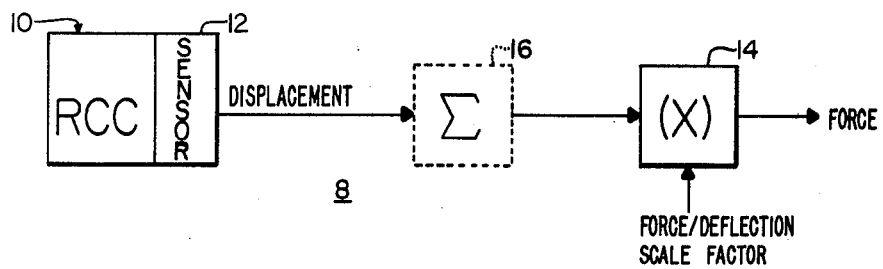
FIG. 1 is a simplified block diagram of a force detecting system for an RCC device according to this invention.

There is shown in FIG. 1 force detecting system 8 including an RCC device 10 which employs axially compressible and shear deformable elements. A single displacement signal from sensor 12 is delivered directly to multiplier 14, which multiplies the displacement by a force detection scale factor to convert the displacement directly to a force. In RCC device 10 the axial displacement of the parts is directly proportionally related to the axial force applied to cause that displacement, and this may be directly applied to multiplier 14. If more than one displacement signal is provided by sensor means 12, then an averaging circuit, summing circuit 16, may be provided to sum all the displacement signals and divide them by the number of such displacement signals to provide the average displacement to multiplier 14; or summing circuit 16 may simply sum and multiplier 14 may include in its scale factor a denominator equivalent to the number of displacement signals in order to provide the average.

Figure 2:
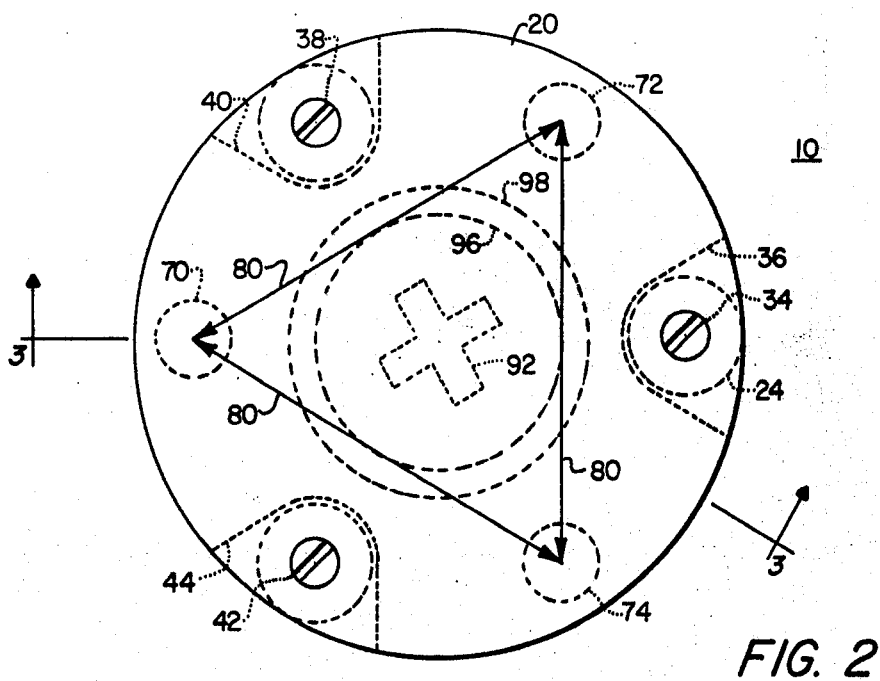
FIG. 2 is a plan view of an RCC device according to this invention.
Figure 3:
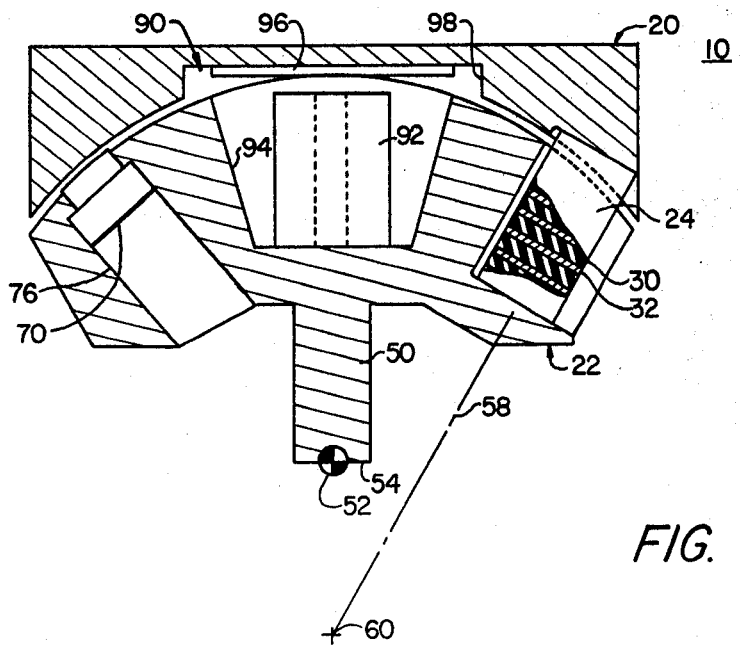
FIG. 3 is a sectional view taken along lines 3—3 of FIG. 2.

RCC device 10 includes a rigid monolithic part, member 20, FIGS. 2 and 3, which is spaced from a second rigid monolithic part, member 22. Members 20 and 22 are interconnected by three axially compressible, shear deformable interconnection elements 24, 26, and 28, only one of which, 24, is visible in FIG. 3. Each element 24, 26, 28 is a cylindrical body made of alternate layers of a polymeric or elastomeric substance 30 interleaved with rigid shims 32, typically made of metal. Element 24 is mounted to upper member 20 by means of screw 34 and is set in recess 36. Elements 26 and 28 are similarly attached to member 20 by means of screw 38 with element 26 set in recess 40 and screw 42 with element 28 set in recess 44, respectively. The lower ends of elements 24, 26 and 28 are mounted in a similar fashion to member 22. An operator member 50 is suspended from member 22 with the remote center of compliance 52 at its free end or tip 54. Elements 24, 26 and 28 are aligned along conical radii 58 emanating from focus 60. Although a number of discrete elements are shown as the shear deformable means, this is not a necessary limitation of the invention. For example, two elements could be used in a two-dimensional device and one element is used in the device pictured in FIG. D.12 explained on p. 137 of the MIT Doctor of Science Thesis of Samual H. Drake, "Using Compliance in Lieu of Sensory Feedback for Automatic Assembly," September 1977, and incorporated herein by reference.

Also disposed along conically-disposed radii from center 52 are three axial proximity displacement sensors 70, 72, 74; sensor 70 is mounted in bore 76 in member 22. Sensors 72 and 74 are similarly mounted in member 22. The distance between each of sensors 70, 72 and 74 are represented by baselines 80. An X,Y optical detector 90 for determining lateral location information and axial rotation information with respect to the relative positions of members 20, 22, includes light source 92 located in recess 94 of member 22, and a detector array 96 located in recess 98 of member 20.

X,Y detector 90 may discern shifts in the X direction, FIG. 4, and shifts in the Y direction, FIG. 5. Detector 90 may also discern rotation $\theta_z$, FIG. 6, as indicated by the misalignment of indicators 100, 102. Axial proximity displacement sensor 70, 72, and 74 may be used to determine the displacement between members 20 and 22, FIG. 7, $D_A$, $D_B$, and $D_C$, not shown, and also to provide the cocking angle or relative rotation $\theta_u$ or $\theta_v$ between members 20 and 22. Angles $\theta_x$ or $\theta_y$ in the preferred cartesian coordinate system may be computed directly, by means of a simple geometric transformation, from the angles in the sensor coordinates, $\theta_u$ and $\theta_v$.

The outputs from detector 90, FIG. 8, may provide directly the X and Y lateral location information and $\theta_z$ axial rotation information. The proximity signals $D_A$, $D_B$, and $D_C$ are directed to a summing circuit 110 which combines the three signals and delivers them to scale factor multiplier 112, which in this case divides the sum by three to obtain the average axial displacement and also multiplies by a scale factor to produce the axial force $F_z$. If desirable or necessary, the output from summing circuit 110 may be simply dividied by a factor of three in divider 114 to provide the average axial displacement Z.

Cocking angle information $\theta_u$, $\theta_v$ may be obtained by taking the algebraic sum of displacement $D_A$, $D_B$ in summer circuit 116 and then multiplying it by a scale factor in multiplier 118 to obtain $\theta_v$. Signals $D_B$ and $D_C$ are combined in summing circuit 120 and then multiplied by a scale factor in multiplier 122 to obtain $\theta_u$.

The cocking angles $\theta_u$ and $\theta_v$ can be related to the cocking angles in the coordinate system of choice, X and Y, by a simple geometric transformation.

Other embodiments will occur to those skilled in the art and are within the following claims:

What is claimed is:

1. A force detecting system for an RCC device comprising:
  a first rigid, monolithic part;
  a second rigid, monolithic part spaced from said first part;
  compressible, shear deformable means interconnecting said first and second parts; and
  at least one axial proximity displacement sensor for detecting the distance between said parts; each said axial proximity detector being disposed along conically-disposed radii from a center.

2. A force detecting system for an RCC device comprising:
  a first rapid, monolithic part;
  a second rigid, monolithic part spaced from said first part;
  compressible, shear deformable means interconnecting said first and second parts;
  at least one axial proximity displacement sensor for detecting the distance between said parts; and
  means for detecting relative axial rotation of said parts.

3. A force detecting system for an RCC device comprising:
- a first rigid, monolithic part;
- a second rigid, monolithic part spaced from said first part;
- at least three compressible, shear deformable members interconnecting said first and second parts and disposed along conical radii from a center; and
- at least one axial proximity displacement sensor for detecting the distance between said parts.

4. The system of claim 3 in which there are two spaced said axial proximity sensors.

5. The system of claim 3 in which there are three spaced said axial proximity sensors.

6. The system of claim 3 in which each said axial proximity detector is disposed along conically-disposed radii from said center.

7. The system of claim 3 further including lateral component displacement sensor means for detecting the relative lateral position of said parts.

8. The system of claim 3 further including means for detecting relative axial rotation of said parts.

9. The system of claim 3 further including means, responsive to at least one said axial proximity displacement sensor, for determining the axial force that caused the sensed displacement.

10. The system of claim 9 in which there are a plurality of axial proximity displacement sensors and said means for determining the axial force includes means for averaging the outputs of said axial proximity sensors and means for applying a scaling factor to convert the average axial displacement to an axial force.

11. A force detecting system for an RCC device comprising:
- a first rigid, monolithic part;
- a second rigid, monolithic part spaced from said first part;
- at least three compressible, shear deformable members interconnecting said first and second parts and disposed along conical radii from a center; and
- at least three axial proximity displacement sensors for detecting the distance between said parts.

12. The system of claim 11 in which said axial proximity displacement sensors are disposed along conically-disposed radii from said center and are located interspaced between said members.

13. The system of claim 11 further including means for averaging the outputs of said axial proximity sensors and applying a scaling factor to convert displacement to force.

14. The system of claim 11 further including means, responsive to the difference in displacement sensed by a pair of axial proximity displacement sensors, for determining the cocking angle of said parts relative to each other.

15. The system of claim 11 further including lateral displacement sensor means for detecting the relative lateral position of said parts.

16. The system of claim 11 further including means for detecting relative axial rotation of said parts.

17. A force detecting system for an RCC device comprising:
- a first rigid, monolithic part;
- a second rigid, monolithic part spaced from said first part;
- at least three compressible, shear deformable members interconnecting said first and second parts and disposed along conically-disposed radii from a center;
- at least one axial proximity displacement sensor for detecting the distance between said parts; and
- means, responsive to at least one said axial proximity displacement sensor, for determining the axial force that caused the sensed displacement.

18. A force detecting system for an RCC device comprising:
- a first rigid, monolithic part;
- a second rigid, monolithic part spaced from said first part;
- at least three compressible, shear deformable members interconnecting said first and second parts and disposed along conically-disposed radii from a center;
- at least three axial proximity displacement sensors for detecting the distance between said parts; and
- means for averaging the outputs of said axial proximity sensors and applying a scaling factor to convert displacement to force.

* * * * *

UNITED STATES PATENT AND TRADEMARK OFFICE
CERTIFICATE OF CORRECTION

PATENT NO. : 4,440,031
DATED : April 3, 1984
INVENTOR(S) : Thomas L. De Fazio

It is certified that error appears in the above-identified patent and that said Letters Patent is hereby corrected as shown below:

Column 4, Claim 2, line 3, "rapid" should read
-- rigid --.

Signed and Sealed this

Twenty-third Day of October 1984

[SEAL]

Attest:

GERALD J. MOSSINGHOFF

Attesting Officer     Commissioner of Patents and Trademarks